(12) United States Patent
Jutla (10) Patent No.: US 7,093,126 B1
(45) Date of Patent: Aug. 15, 2006

(54) ENCRYPTION SCHEMES WITH ALMOST FREE INTEGRITY AWARENESS

(75) Inventor: Charanjit Jutla, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,754

(22) Filed: Apr. 14, 2000

(51) Int. Cl.
*G06F 17/00* (2006.01)

(52) U.S. Cl. .................. 713/168; 713/170; 713/180

(58) Field of Classification Search ............... 713/168, 713/181, 161, 170, 189, 200–202, 180
See application file for complete search history.

(56) References Cited

U.S. PATENT DOCUMENTS 5,297,208 A * 3/1994 Schlafly et al. ............. 380/261
6,226,742 B1 * 5/2001 Jakubowski et al. ........ 713/170

OTHER PUBLICATIONS

Computing with very weak random sources; Srinivasan, A.; Zuckerman, D.; Foundations of Computer Science, 1994 Proceedings., 35th Annual Symposium on Nov. 20-22, 1994 pp. 264-275.*

Randomness-Efficient Sampler for Matrix-valued Functions and Applications; Wigderson, A.; Xiao, D., Foundations of Computer Science, 2005. FOCS 2005. 46th Annual IEEE Symposium on Oct. 23-25, 2005 pp. 397-406.*

Randomness extractors and their many guises; Vadhan, S.P.; Foundations of Computer Science, 2002. Proceedings. The 43rd Annual IEEE Symposium on Nov. 16-19, 2002 p. 9.*

* cited by examiner

*Primary Examiner*—David Jung
(74) *Attorney, Agent, or Firm*—Scully, Scott, Murphy & Presser; Marian Underweiser (57) ABSTRACT

An encryption/decryption method and system. The method comprises the steps of encrypting a plaintext message by dividing the plaintext message into a multitude of plaintext blocks and encrypting the plaintext blocks to form a multitude of cyphertext blocks. A single pass technique is used in the method to embed a message integrity check in the cyphertext blocks. The method further comprises the steps of decrypting the cyphertext blocks to re-form the plaintext blocks, and testing the message integrity check in the cyphertext blocks to test the integrity of the re-formed plaintext blocks.

15 Claims, 10 Drawing Sheets

ENCRYPTION SCHEMES WITH ALMOST FREE INTEGRITY AWARENESS

FIELD OF THE INVENTION

This invention relates to a method and apparatus for cryptographically transforming an input message into an output message while assuring message integrity.

DESCRIPTION OF THE PRIOR ART

Cryptographic systems are known in the data processing art. In general, these systems operate by performing an encryption operation on a plaintext input message, using an encryption key, and a symmetric key block cipher, producing a ciphertext message. The encrypted message may then be sent over an unreliable and insecure channel to a receiver who shares the secret key. The receiver of the encrypted message performs a corresponding decryption operation, using the same key to recover the plaintext block. Because the same key is used by both the sender and receiver of the message, the process is referred to as a "symmetric key" process.

There is a related issue of message integrity. To elaborate, although the receiver of the ciphertext message can decrypt the ciphertext, the receiver is not assured that the ciphertext was not accidently or maliciously altered during transmission. To ensure message integrity, the ciphertext message come accompanied with a message authentication code (MAC). This MAC is generated by the sender from the ciphertext using a cryptographic hash function.

Usually, the total computational time spent on encrypting the message is of the same order of magnitude as the time spent computing the subsequent MAC. Thus, two passes of about equal duration are required to produce a ciphertext message along with its integrity assuring MAC.

SUMMARY OF THE INVENTION

An object of the present invention is to provide a new encryption scheme which securely generates a ciphertext which in itself contains checks for assuring message integrity.

Another object of this invention is to provide an encryption scheme which generates a ciphertext with message integrity in a single pass with almost no additional computational cost, as compared to previous schemes which do not generate the message integrity checks.

These and other objects are attained with an encryption/decryption method and system. The method comprises the steps of encrypting a plaintext message by dividing the plaintext message into a multitude of plaintext blocks and encrypting the plaintext blocks to form a multitude of cyphertext blocks. A single pass technique is used in this process to embed a message integrity check in the cyphertext blocks. The method further comprises the steps of decrypting the cyphertext blocks to re-form the plaintext blocks, and testing the message integrity check in the cyphertext blocks to test the integrity of the re-formed plaintext blocks.

Preferably, the message integrity check is embedded in the cyphertext blocks by generating a random number, expanding the random number to generate a first set of pseudo random numbers, expanding the first set of pseudo random numbers to generate a second set of pairwise independent pseudo random numbers, and using the random number and the second set of numbers to embed the message integrity check in the cyphertext blocks as the cyphertext blocks are being formed. With this preferred embodiment, during the decryption process, the random number and the second set of numbers are obtained from the cyphertext blocks as those cyphertext blocks are decrypted, and this second set of numbers are used to re-form the plaintext blocks from the cyphertext blocks. Also, the testing step includes the step of applying a predetermined test to the re-formed plaintext blocks to test the integrity of the re-formed plaintext blocks.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

In this specification and the drawings, a plaintext message is denoted by "P," and a ciphertext message is denoted by "C." The length of the plaintext and ciphertext are measured in blocks, where a block is the number of bits of input/output of a block cipher used in this construction. Thus, if the plaintext P is of length m blocks, then the individual blocks of this message are designated as $P_1, P_2, \ldots, P_m$. Similarly, the ciphertext blocks are designated as $C_1, C_2, \ldots, C_n$.

FIGS. 1–4 generally illustrate a prior art encryption/decryption procedure of the type referred to as cipher block chaining (CBC). In this process, a sending party encrypts a plaintext message using encryption mechanism 101, and the encrypted message is sent over an insecure or non-secure communication medium 102 to a receiving party. This latter party uses a decryption mechanism 103 to decipher the message.

Figure 1:
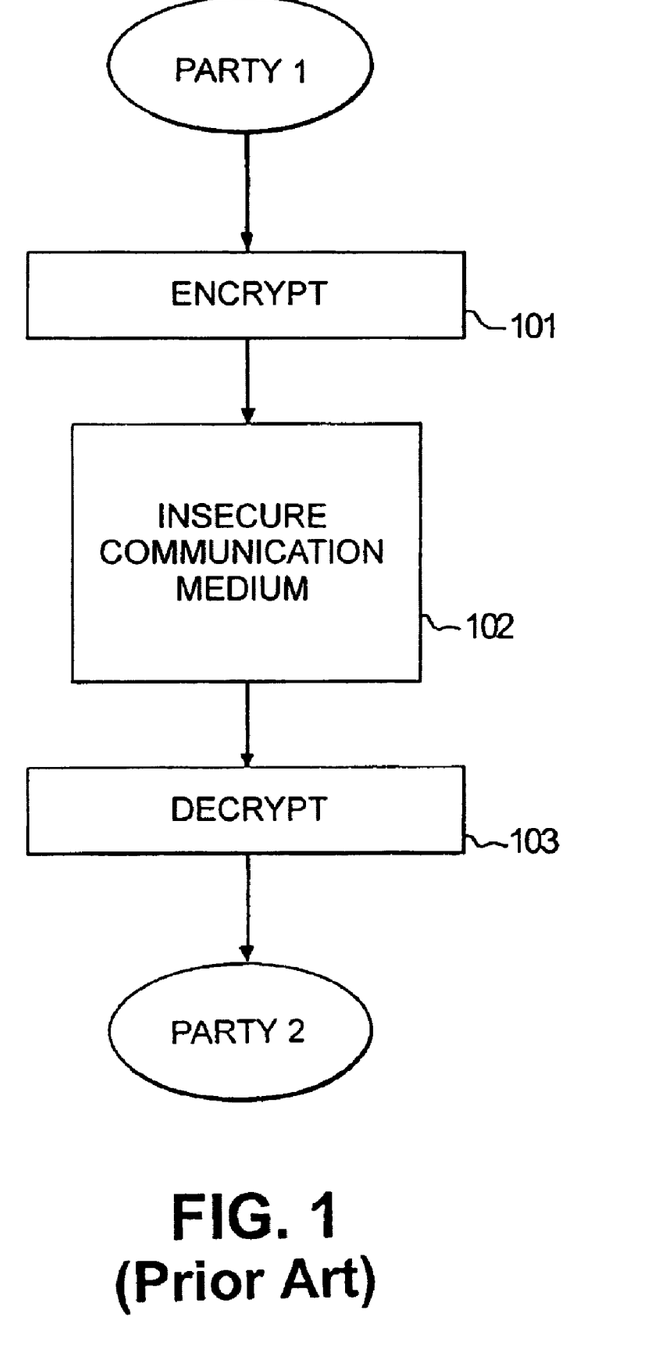
FIG. 1 generally illustrates the encryption/decryption process and shows the general notations of encryption and decryption.
Figure 2:
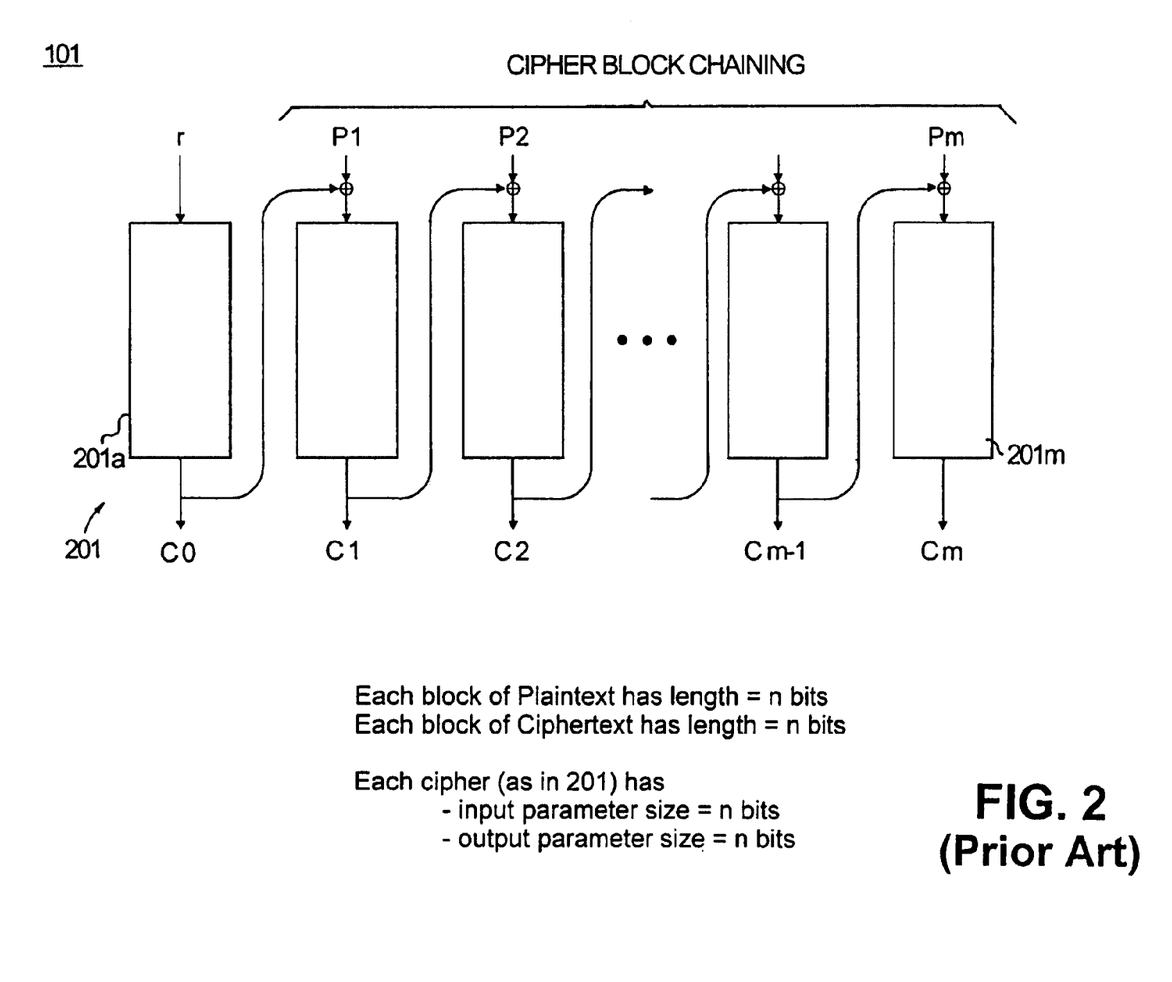
FIG. 2 shows a prior art encryption mode referred to as cipher block chaining (CBC).
Figure 3:
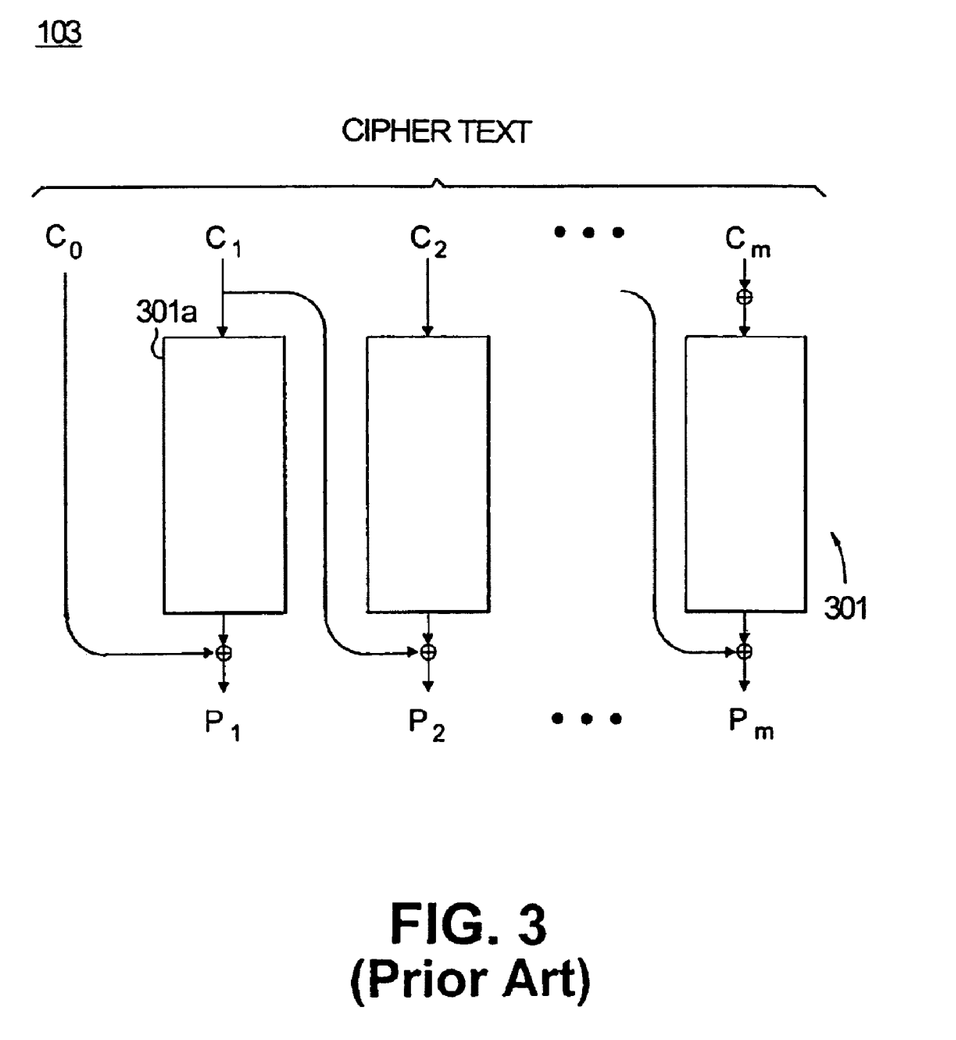
FIG. 3 shows the CBC decryption mode.

FIGS. 2 and 3 respectively show the encryption and decryption mechanisms 101 and 103 in greater detail. With reference to FIG. 2, mechanism 101 includes a series, or chain, of cipher blocks 201. Each cipher block is provided with the key K. The first block 201a is also provided with a random number r that is n bits long. Each of the successive cipher blocks in the chain is provided with a respective one block of the plaintext and with the output of the previous block in the chain. Preferably, for each of the cipher blocks after the first one, an exclusive or function is applied to the two text blocks applied to the cipher block. Each of the cipher blocks $201a$–$201m$ outputs a respective one block of the ciphertext.

With reference to FIG. 3, mechanism 103 includes a series, or chain, of cipher blocks 301. Each block is provided with the key K and with a respective one of the ciphertext blocks. For the first block $301a$ in chain 301, an exclusive or operation is applied to the output of the block and the first ciphertext block. For the other blocks in chain 301, an exclusive or operation is applied to the output of the block and the input of the previous block. The exclusive or operations performed on the outputs of the cipher blocks produce the original plaintext blocks.

Figure 4:
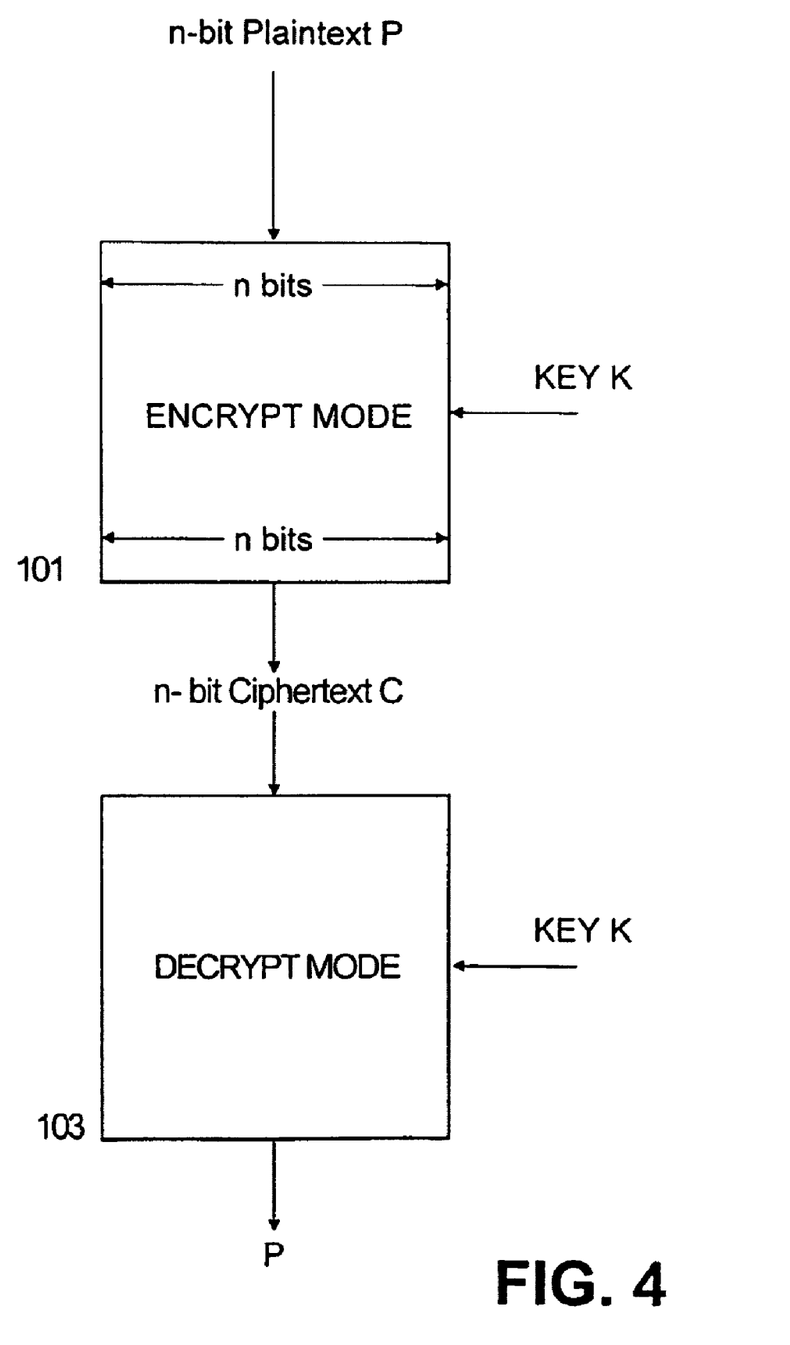
FIG. 4 illustrates the specifications of a block cipher used in the above encryption schemes.

The operation of the encryption/decryption procedure is summarized in FIG. 4. As particularly shown in this Figure, each plaintext block, and each produced ciphertext block, is n bits long. Also, the same key K is used by the encryption and decryption mechanisms 101 and 103.

FIGS. 5–9 illustrate an encryption/decryption process embodying the present invention. Generally, the encryption process includes three steps. The first step is the randomness generation and its expansion, the second step is the further expansion of the randomness, and the third step is the actual encryption of the plaintext using the above generated randomness to produce the ciphertext.

Figure 5:
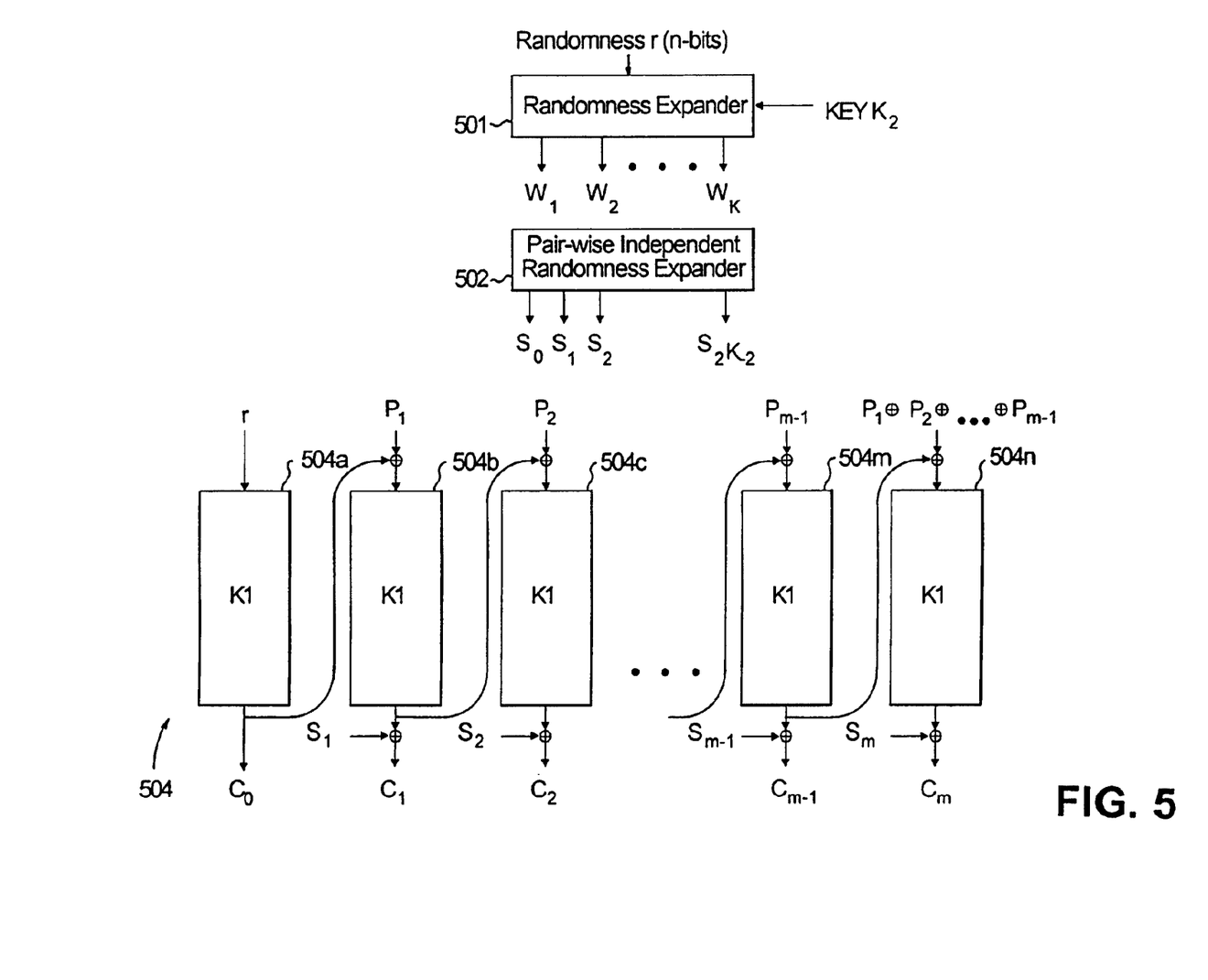
FIG. 5 shows an encryption scheme, with built in message integrity, embodying the present invention.

More specifically, in this first step, a random number r is generated. The randomness r may be generated by any of the well known techniques to generate randomness. This number r is applied to expander 501; and this expander, using a key K2, outputs k values, represented as $W_1 \ldots W_k$. The randomness r and each of the output values $W_1 \ldots W_k$ is n bits long.

Figure 6:
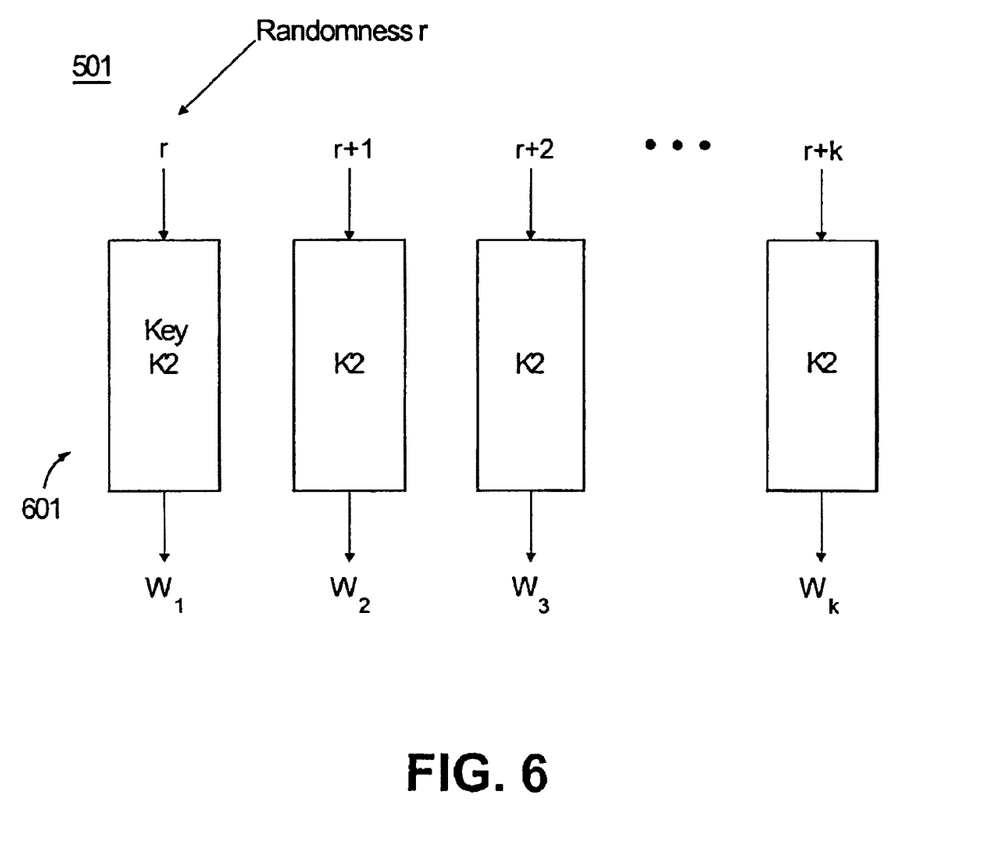
FIG. 6 illustrates how randomness is expanded in the encryption scheme of FIG. 5.

FIG. 6 illustrates the operation of expander 501 in greater detail. As shown therein, k values obtained from r (and specifically, r, r+1, r+2, ..., r+k) are applied to cipher blocks 601, which generate the output values $W_1 \ldots W_k$. The numbers so generated are known in the art as pseudo random numbers.

As shown in FIG. 5, these k values, $W_1 \ldots W_k$, are applied to pair-wise independent randomness expander 502. This expander, using a process discussed below, outputs a series of S values, $S_0, S_1, \ldots$, each of which is also n bits long. The number of values in this S series is equal to $2^k-1$, and thus the last value in the series is represented as $S_2{}^k-2$.

Figure 7:
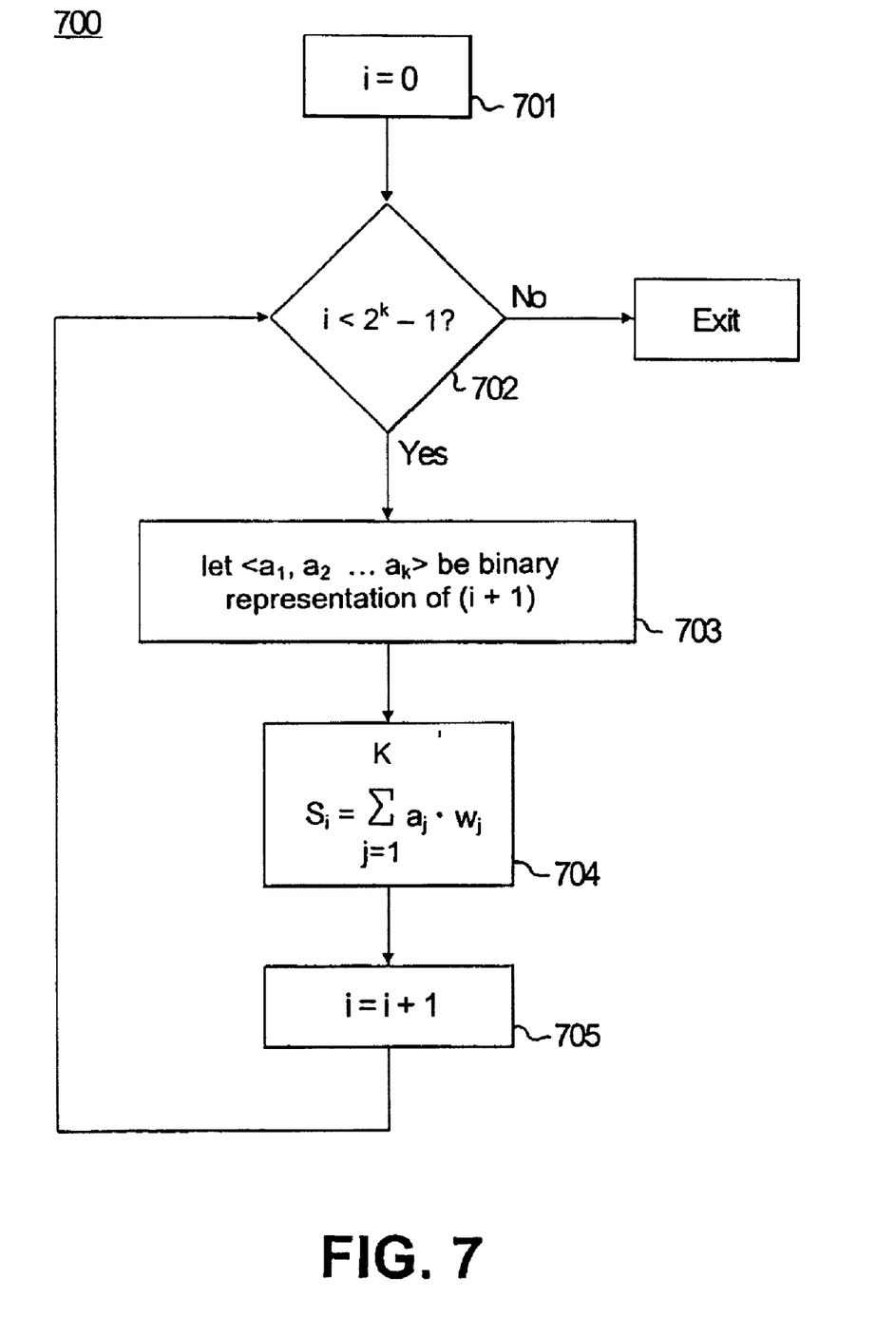
FIG. 7 shows how randomness can be expanded in a pairwise independent fashion.

FIG. 7 is a flow chart 700 showing how expander 502 works. At step 701, a variable i is set equal to 0; and then at step 702, i is compared to $2^k-1$. If i is not less than $2^k-1$, then the routine exits; however, if i is less than $2^k-1$, then the routine proceeds to steps 703, 704 and 705. At step 703, the binary form of i+1 is represented as $a_1 a_2 a_3 \ldots a_k$. Then, at step 704, the variable $S_i$ is set equal to $$\sum_{2=1}^{k}$$

$a_j.w_j$, where $$\sum_{2=1}^{k}$$

represents the exclusive or operation performed, on a bit location by bit location basis, in sequence to the product of $a_j$ and $w_j$. Then, at step 705, i is increased by one, and the routine returns to step 702. Steps 702–705 are repeated until i becomes not less than $2^k-1$, at which time the routine exits.

An important advantage of this process is that the expansion does not require any cryptographic operations, as opposed to expander 501, which does require a block cipher.

With reference again to FIG. 5, after r and the S values are generated, the blocks of plaintext $P_1$–$P_m$ are encrypted to obtain the cyphertext blocks $C_1$–$C_m$. A series of m+1 cypher blocks 504 are used to do this. Each of these cypher blocks is provided with the key K1. The first block $504a$ is also provided with the random number r. Each of the following cypher blocks, except the last one $504n$, is provided with a combination of a respective one of the plaintext blocks and the output of the preceding cypher block. In particular, this combination is the result of the exclusive or operation performed on the two inputs, on a bit location by bit location basis. The last cypher block $504n$ in the series is provided with the combination of (i) the output of the previous block, and (ii) the result of a series of exclusive or operations performed on the sequence of plaintext blocks $P_1, P_2, \ldots, P_{m-1}$. This combination is the result of the exclusive or operation performed on the two inputs.

The output of the first cypher block $504a$ is the first block of cyphertext $C_o$. The other blocks of cyphertext, $C_1$–$C_m$, are obtained by performing the exclusive or operation, on a bit location by bit location basis, on the output of each cypher block and a respective one of the S values. Specifically, $S_1$–$S_{m-1}$ are applied to the outputs of blocks $504b$ through $504m$ respectively, while $S_o$ is applied to the output of the last block $504n$.

Known techniques may be employed to perform the first and second steps of the encryption process. The third step is unique in the way pairwise independent randomness is used in the encryption process so as to ensure message integrity.

The pseudo code for the third step is listed below. Block_Encrypt is a block cipher which encrypts one block using a key. It takes two arguments. The first argument is the block to be encrypted, and the second argument is the key.

A01 C0=Block_Encrypt(r,K1)
A02 N0=C0
A03 For i=1 to m−1 do
A04 Ni=Block_Encrypt (Pi xor N(i−1))
A05 Ci=Ni xor Si
A06 EndFor
A07 Checksum=0
A08 For i=1 to m−1 do
A09 Checksum=Checksum xor Pi
A10 EndFor
A11 Cm=S0 xor Block_Encrypt (N(m−1) xor checksum, K1)

Figure 8:
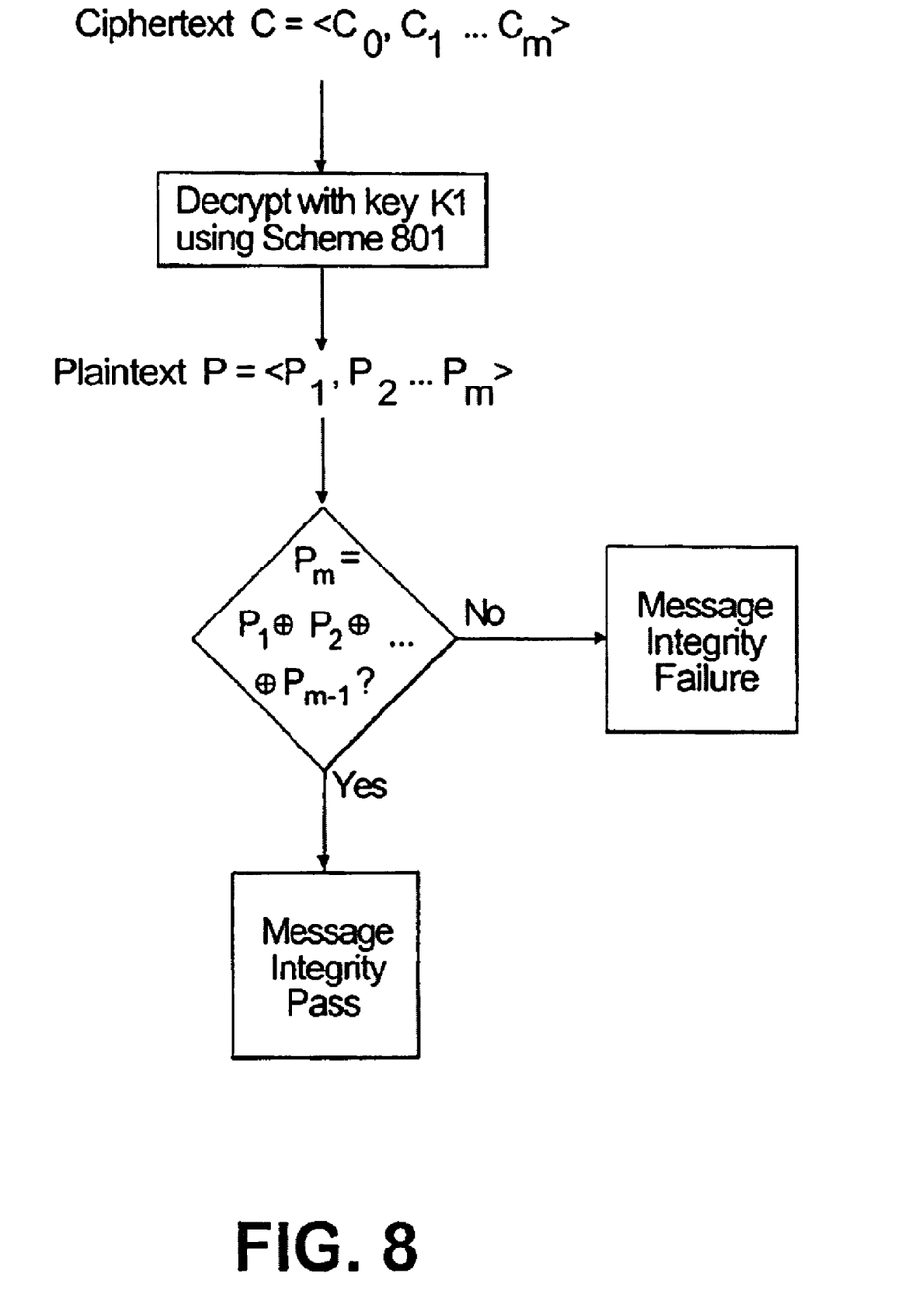
FIG. 8 shows an embodiment of the invention in a decryption mode.

FIG. 8 generally illustrates the decryption process. In this process, the ciphertext blocks are applied to decrypter 801, which outputs the plaintext blocks. Then, these plaintext blocks are used to determine if $P_m$ is equal to the result obtained by applying the exclusive or function, on a bit location by bit location basis, to the sequence of the plaintext blocks $P_1, P_2, \ldots, P_{m-1}$. The message passes or fails the integrity test if $P_m$ is, respectively, equal to or not equal to this result.

Figure 9:
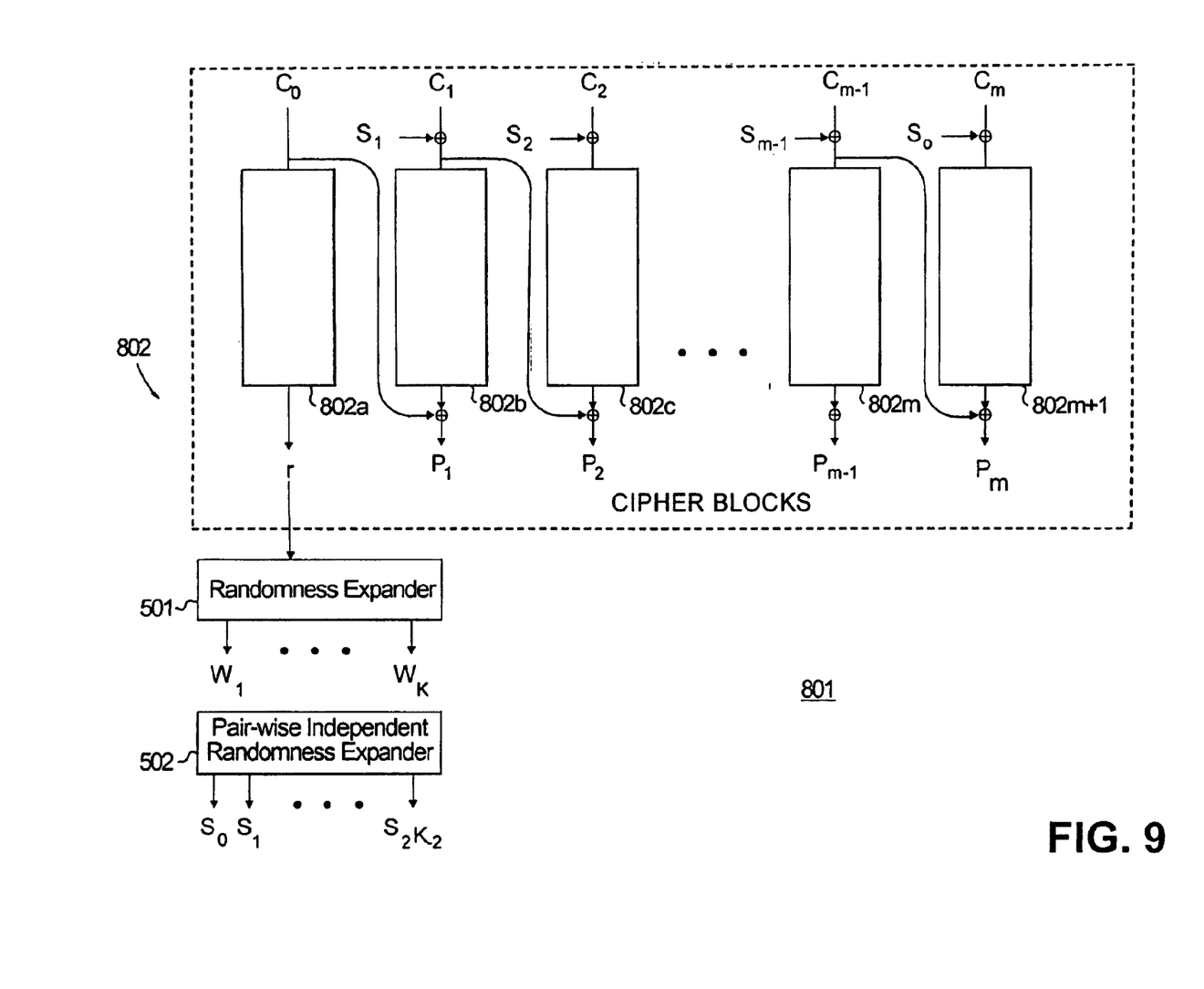
FIG. 9 illustrate the main step in the decryption mode.

FIG. 9 illustrates the operation of decryptor 801 in greater detail. As shown in this Figure, the decryptor includes a series of cipher blocks 802. Each of the cipher blocks is provided with the key K, and with a respective one of the cyphertext blocks $C_o, \ldots, C_n$. Each of these cipher blocks, except the first one $802a$, is also provided with a respective one of the S values. In particular, blocks $802b$ through $802m$ are provided with $S_1$ through $S_m$ respectively, and the last cypher block 802m+1 is provided with $S_0$. The exclusive or operation is performed on the C and S values provided to each cypher block.

The output of the first cypherblock 802a is the random number r. For each of the other cypher blocks 802b–802n, the exclusive or function is applied to the output of the block and the input to the previous block to obtain a respective one of the plaintext blocks $P_1$–$P_m$.

The pseudo code for the decryption process is given below. In this psuedo code, Block_Decrypt refers to a block cipher which decrypts one block using a key. It takes two arguments. The first argument is the block to be decrypted, and the second argument is the key.

Figure 10:
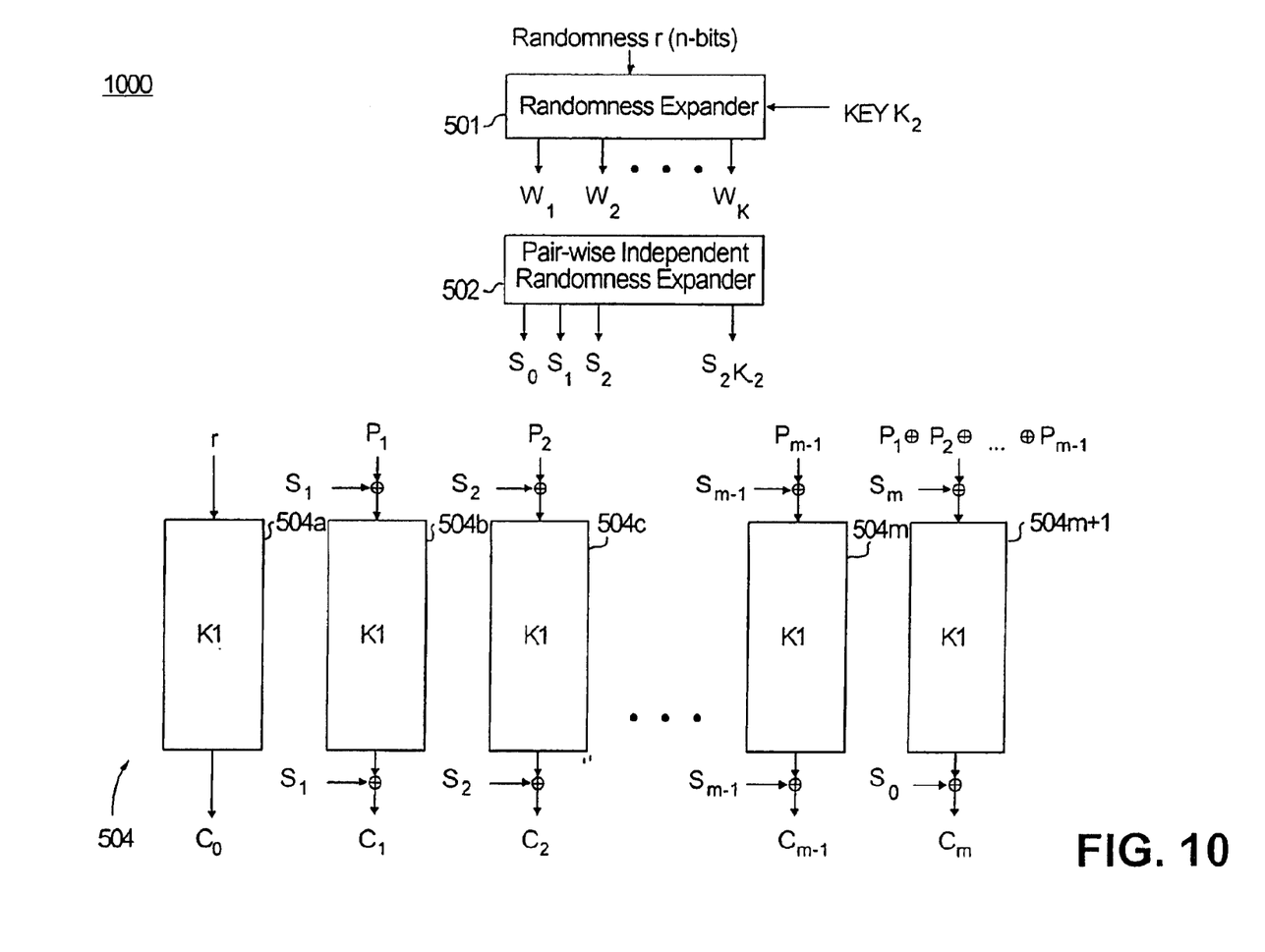
FIG. 10 shows an alternate embodiment of the present invention.

B01 r=Decrypt (C0K1)
B02 Expand r into S0, S1, Sm as in 501 and 502
B03 N0=C0
B04 For i=1 to m−1
B05 Ni=Ci xor Si
B06 Pi=N(i−1) xor Block_Decrypt(Ni, K1)
B07 End For
B08 Pm=N9m−1) xor Block_Decrypt (Cm xor S0, K1)
B09 For i=1 to m−1
B10 Checksum=Checksum xor Pi
B11 EndFor
B12 If Pm=Checksum accept decrypted Message P as integral
B13 Else reject P as not integral FIG. 10 illustrates an alternate encryption mechanism 1000 embodying this invention. This mechanism is similar to the mechanism disclosed in FIG. 5; however, with the mechanism disclosed in FIG. 10, the S values are applied both to the outputs and to the inputs of cipher blocks 504. In particular, with the mechanism disclosed in FIG. 10, each of the blocks is provided with the key K1. The first block 504a is also provided with the random number r. Each of the following cipher blocks, except the last one, is provided with the combination of a respective one of the plaintext blocks and a respective one of the S values. Specifically, this combination is the result of the exclusive or operation performed on the two inputs, on a bit location by bit location basis. The last cipher block 504m+1 in the series is provided with the combination of (i) $S_m$ and (ii) the result of a series of exclusive or operations performed on the sequence of plaintext blocks $P_1, \ldots, P_{m-1}$. This combination is the result of the exclusive or operation performed on the two inputs.

As with the system of FIG. 5, the output of the first cypher block 504a of mechanism 1000 is the first block of cyphertext $C_1$. The other blocks of cyphertext, $C_1$–$C_m$, are obtained by performing yhe exclusive or operation, on a bit location by bit location basis, on the output of each cypher block and a respective one of the S values. Specifically, $S_1$–Sm are applied to the outputs of blocks 504b–504m respectively, while $S_0$ is applied to the output of the last block in the series.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of encrypting a plaintext message while providing the message with an embedded integrity check, and decrypting the message, the method comprising the steps:

using a single pass technique both to encrypt a plaintext message and to embed a message integrity check in the encrypted message, including the steps of
  i) dividing the plaintext message into a multitude of plaintext blocks,
  ii) encrypting the plaintext blocks to form a multitude of cyphertext blocks; and
  iii) embedding the message integrity check in the cyphertext blocks;
decrypting the cyphertext blocks to re-form the plaintext blocks; and
testing the message integrity check in the cyphertext blocks to test the integrity of the re-formed plaintext blocks;
wherein the step embedding the message integrity check in the cyphertext blocks includes the steps of:
  generating a random number;
  using a randomness expander for expanding the random number to generate a first set of pseudo random numbers;
  expanding the first set of numbers to generate a second set of pairwise independent pseudo random numbers; and
  using the random number and the second set of pseudo random numbers to embed the message integrity check in the cyphertext blocks as the cyphertext blocks are being formed.

2. A method according to claim 1, wherein the embedding step includes the step of embedding the integrity check in the cyphertext blocks during the encrypting step.

3. A method according to claim 1, wherein
the encrypting step includes the step of passing each of the plaintext blocks through a respective one of a series of cipher blocks to encrypt the plaintext blocks; and
the embedding step includes the step of combining generated members, in accordance with a defined procedure, with outputs of at least some of the cipher blocks to embed the integrity check in the cyphertext blocks.

4. A method according to claim 1, wherein the using step includes the further step of embedding the pairwise independent pseudo-random numbers in said plaintext blocks using non-cryptographic operations to form transformed plaintext blocks.

5. A method according to claim 4, wherein the step of using the random number and the second set of pseudo random numbers to embed the message integrity check in the cyphertext blocks includes the steps of embedding said pairwise independent pseudo random numbers in said cyphertext blocks to form transformed cyphertext blocks.

6. A method according to claim 5, wherein the step of embedding the pairwise independent pseudo random numbers in said cyphertext blocks includes the step of:
pairing each one of the first n of the pairwise independent pseudo random numbers such a respective one of the first n cyphertext blocks.

7. A method according to claim 1, wherein the random number and the second set of pseudo-random numbers are all unencrypted when used to embed the message integrity check in the cyphertext blocks.

8. A method according to claim 1, wherein:
the step of decrypting the cyphertext blocks includes the steps of
  i) decrypting the cyphertext blocks to obtain the random number and said second set of numbers, and
  ii) using the second set of numbers to re-form the plaintext blocks from the cyphertext blocks; and the testing step includes the step of applying a predetermined test to the re-formed plaintext blocks to test the integrity of the re-formed plaintext blocks.

9. A method according to claim 1, wherein the step of expanding the random number includes the step of using the plaintext and the ciphertext blocks to expand the random number to generate the set of pseudo random numbers.

10. A system for encrypting a plaintext message while providing the message with an embedded integrity check, and decrypting the message, the system comprising:
means for using a single pass technique both to encrypt a plaintext message and to embed a message integrity check in the encrypted message, including
  i) means for dividing the plaintext message into a multitude of plaintext blocks,
  ii) means for encrypting the plaintext blocks to form a multitude of cyphertext blocks, and
  iii) means for embedding the message integrity check in the cyphertext blocks;
means for decrypting the cyphertext blocks to re-form the plaintext blocks; and
means for testing the message integrity check in the cyphertext blocks to test the integrity of the re-formed plaintext blocks;
wherein the means for embedding the message integrity check in the cyphertext blocks includes:
  means for generating a random number;
  means for expanding the random number to generate a first set of pseudo random numbers;
  a randomness expander for expanding the first set of pseudo random numbers to generate a second set of pairwise independent pseudo random numbers; and
  means for using the random number and the second set of numbers to embed the message integrity check in the cyphertext blocks, using a non-cryptographic procedure, as the cyphertext blocks are being formed.

11. A system according to claim 10, wherein:
the means for decrypting the cyphertext blocks includes
  i) means for decrypting the cyphertext blocks to obtain the random number and said second set of numbers, and
  ii) means for using the second set of numbers to re-form the plaintext blocks from the cyphertext blocks; and
  the testing means includes means for applying a predetermined test to the re-formed plaintext blocks to test the integrity of the re-formed plaintext blocks.

12. A system according to claim 10, wherein the means for expanding the random number includes means for using the plaintext and the ciphertext blocks to expand the random number to generate the set of pseudo random numbers.

13. A program storage device readable by machine, tangibly embodying a program of instructions executable by the machine to perform method steps for encrypting a plaintext message while providing the message with an embedded integrity check, and decrypting the message, said method steps comprising:

using a single pass technique both to encrypt a plaintext message and to embed a message integrity check in the encrypted message, including the steps of
  i) dividing the plaintext message into a multitude of plaintext blocks,
  ii) encrypting the plaintext blocks to form a multitude of cyphertext blocks; and
  iii) embedding the message integrity check in the cyphertext blocks;
decrypting the cyphertext blocks to re-form the plaintext blocks; and
testing the message integrity check in the cyphertext blocks to test the integrity of the re-formed plaintext blocks;
wherein the step of embedding the message integrity check in the cyphertext blocks includes the steps of:
  generating a random number;
  expanding the random number to generate a first set of pseudo random numbers;
  using a randomness expander for expanding the first set of numbers to generate a second set of pairwise independent pseudo random numbers; and
  using the random number and the second set of pseudo random numbers to embed the message integrity check in the cyphertext blocks as the cyphertext blocks are being formed.

14. A program storage device according to claim 13, wherein:
the step of decrypting the cyphertext blocks includes the steps of
  i) decrypting the cyphertext blocks to obtain the random number and said second set of numbers, and
  ii) using the second set of numbers to re-form the plaintext blocks from the cyphertext blocks; and
  the testing step includes the step of applying a predetermined test to the re-formed plaintext blocks to test the integrity of the re-formed plaintext blocks.

15. A method according to claim 1, wherein:
the step of encrypting the plaintext blocks includes the steps of:
  i) applying the plaintext blocks to a series of cipher blocks, and
  ii) generating a respective one output from each of said series of cipher blocks; and
  the step of using the random number and the second set of pseudo random numbers to embed the message integrity check in the cyphertext blocks includes the step of combining the output of each of said series of cipher blocks with a respective one of the second set of pseudo random numbers to form a respective one of the cyphertext blocks, and thereby embedding the message integrity check in the cyphertext blocks.

* * * * *